UNITED STATES PATENT OFFICE.

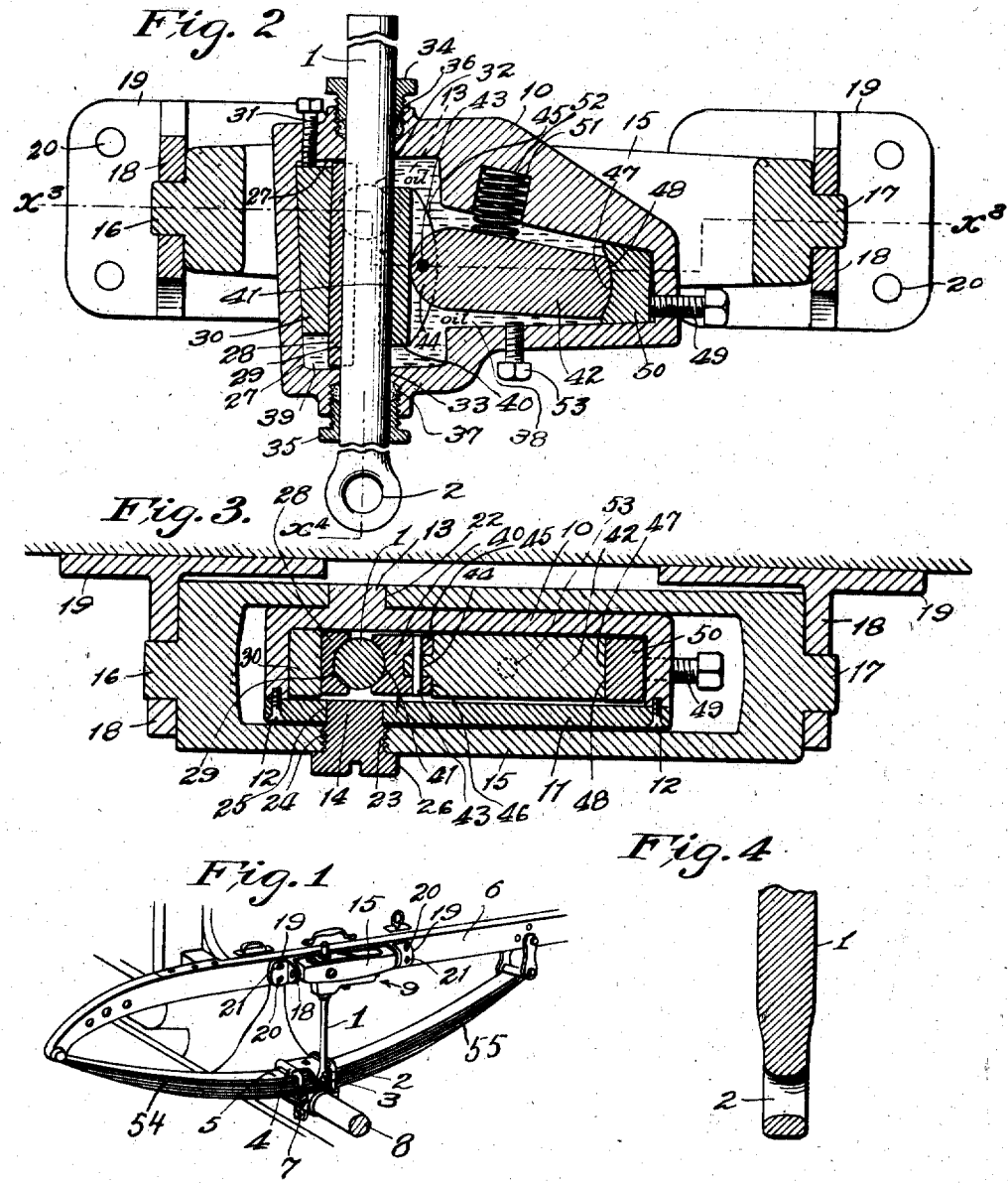

GEORGE CUSHING MARTIN, OF LOS ANGELES, CALIFORNIA.

SHOCK-ABSORBER FOR AUTOMOBILES AND OTHER VEHICLES.

1,002,416.      Specification of Letters Patent.     Patented Sept. 5, 1911.

Application filed April 10, 1909. Serial No. 489,214.

*To all whom it may concern:*

Be it known that I, GEORGE CUSHING MARTIN, a citizen of the United States, residing at Los Angeles, in the county of Los Angeles and State of California, have invented a new and useful Shock-Absorber for Automobiles and other Vehicles, of which the following is a specification.

The object of this invention is to make provision whereby the body of the vehicle will be carried evenly with comparatively small up-and-down motion.

A feature of this invention is the combination with the springs, of means whereby the expansion of the springs after compression is yieldingly resisted and the compression of the springs is unresisted except at the initial compressing movement.

The invention is capable of application in any relation where two movable elements are yieldingly held apart by resilient means, and I employ in combination with such elements and resilient means a slip-rod and a friction-clutch arranged to allow the rod to slide freely as said elements move toward each other, and to be frictionally gripped and thereby retarded as the elements move apart; the principle being that the resiliency of the spring shall only be employed to take up the movement of the one element without objectionably imparting movement to the other element by reason of the expansion of the springs.

A feature is to so construct the device that the initial compressing movement of the spring shall be resisted somewhat, thus to compensate for the comparatively great resiliency of the spring at that time.

In applying the invention to a motor-car or other vehicle, a slip-rod and gripping device or clutch therefor may be applied between each axle and the vehicle-frame, and preferably such device is applied at each spring.

The accompanying drawings illustrate the invention.

Figure 1 is a view of the shock-absorber comprising the spring-control applied in connection with an automobile spring and body. Fragments of the vehicle-body and axle-tree are shown. Fig. 2 is a fragmental view partly in section showing the spring-controlling mechanism. Fig. 3 is a section on line $x^3$, Fig. 2. Fig. 4 is a sectional detail of the eye of the slip-rod.

The slip-rod 1 is a smooth cylinder provided at one end with an eye 2 adapted to form a universal joint in connection with a pin 3 carried by a clip-plate 4 adapted for attachment to a movable element as the base 5 of the spring or the frame 6 of the vehicle-body. In the drawing, the clip-plate 4 is shown fastened by the clips 7 to the base 5 of the spring and the axle-tree 8. The cylindrical body of the rod 1 is extended through a gripping device or friction-clutch 9 arranged to more or less forcibly grip the rod 1 and to allow the same to slide with more or less resistance responsive to the recoil of the spring leaves 54, 55. Means are provided whereby the frictional resistance of the slip-rod may be regulated.

The clutch-mechanism is mounted inside a swiveled case comprising a box 10 and a cover 11 fastened together by suitable means as the screws 12, said case being pivotally connected by pivots 13, 14, with a pivoted frame 15 which is pivoted by studs 16, 17, to bracket-arms 18 carried respectively by bracket-plates 19 that are provided with screw-holes 20 and thereby adapted to be fastened by screws 21 to a movable element as the frame 6. The pivots 13, 14, frame 15, and studs 16, 17, mount the case 10 of the clutch-mechanism with a universal joint to accommodate all of the movements of the spring, the rod, and the vehicle-frame relative to each other. The pivot 13 is formed as a part of the box 10 and fits a bearing 22 in the frame 15. The pivot 14 has a screw-threaded portion 23 to screw into the screw-threaded seat 24 in the frame 15 opposite the bearing 22, and the inner end of this pivot is cylindrical to fit a bearing 25 in the cover 11 of the box 10; said pivot 14 being also provided with a slotted head 26 by which it may be screwed into place and which will engage the frame 15 so that the screw may be tightly set without engaging the mechanism contained within the case.

The box 10 of the case is provided with ways 27 in which is adjustably mounted a jaw 28 that is provided with a longitudinal groove 29 to fit one side of the cylindrical rod 1. The adjustment of this jaw may be accomplished by any suitable means, as by a wedge 30 that slides between the ways 27 to force the jaw in one direction. Said wedge 30 is operated by a screw 31 by which it may be moved to shift the jaw as occasion may demand to engage the rod 1. The box 10 of the case has two alined holes 32 and 33 provided with glands 34, 35, and packing-chambers 36, 37, with packing therein to pack the slip-rod 1 and allow the same to slip through the box without allowing the escape of oil 38 from the chamber 39 of the case which is charged with oil to prevent noise, wear and heating. When the slip-rod 1 is mounted in the glands the jaw 28 may be adjusted to tightly fit against one side of the slip-rod by screwing the screw 31 to appropriately move the wedge 30. 40 is a brake-shoe provided with a groove 41 to fit the other side of the slip-rod 1. Said brake-shoe is pivotally connected with a swinging bar 42 by means of a pivot 43 passing through a tongue 44 of the bar 42 and also through ears 45, 46, of the brakeshoe 40. Said bar has a rounded end 47 seated in a concave seat 48 so as to move pivotally on its end opposite the brake-shoe and is adjustable toward and from the sliprod 1 by any suitable means as a set-screw 49 operating on a movable block 50 which carries the seat 48. However, the block 50 may be adjusted by a wedge-contrivance the same as the shoe 28 is adjusted, and the shoe 28 may be adjusted by a set-screw in a manner corresponding to that in which the block 50 is adjusted; the method of adjustment being in a measure immaterial. This and other variations may be made without departing from the spirit of the invention.

The bar 42 is yieldingly held toward the eye 2 of the slip-rod by a spring 51 seated in a seat 52 in the box so that the brakeshoe 40, the bar 42, and the seat-piece 50 form the elements of a toggle-joint operable by the friction of the moving slip-rod to increase the friction on the rod when the clutch moves toward the eye or the eye toward the clutch, and to relieve such friction on reverse relative movement of the rod and shoe. The set-screw 53 forms an adjustable stop to prevent the bar from swinging too far down in case the brakeshoe is to engage the slip-rod 1 with a limited pressure. The brake-shoe 40 and the swinging bar 42 constitute a togglejoint construction operable by friction of the slip-rod on the brake-shoe to cause the brake-shoe to wedge against the slip-rod under the impulse of the expanding resilient portions 54 and 55 of the spring, so that when the spring ceases to force the relatively-movable elements, as the axle 8 or the base 5 of the spring, and the frame 6 apart, and the spring comes to normal position, the slip-rod 1 is tightly wedged between the jaw 28 and the shoe 40, and such wedging offers a resistance to the initial movement of either element toward the other. In this way the relative movement of parts, when a wheel of a vehicle provided with this device goes over an obstruction in the road, will be first, as the axle 8 rises it meets the resistance not only of the expanding springleaves 54 and 55, but also the resistance of the friction between the slip-rod and the jaw and the shoe wedged by the swinging bar 42. Immediately this resistance is overcome, the shoe being pushed upward, releases the slip-rod and allows it to move freely until the upward movement of the axle 8 toward the frame 6 is stopped by the resiliency of the spring-leaves 54 and 55. At this moment the force of said leaves is exerted to move the frame 6 away from the axle, and tends to relatively move the shoe and rod as though the slip-rod 1 were drawn downward relative to the shoe; and thereupon the friction between said rod and the brake-shoe drags the brake-shoe toward the side of the case near the eye 2, said shoe being also impelled by the spring 51, and the result is to again frictionally engage the slip-rod tightly, thus to resist separating movement of the elements and to prevent rebounding of the vehicle frame and body.

The brackets 19 are separate from each other so as to be convenient for attachment to different faces of the element to which the frame is to be attached. The base of the brackets need not be in the same plane.

I claim:—

1. The combination of a case, a rod extending into the case, a jaw in the case to engage one side of the rod, a shoe to frictionally engage the other side of the rod, and a bar pivotally mounted in the case and forming with the shoe a toggle-joint to produce increased friction on the rod when the shoe is moved in one direction by friction of the moving rod on the shoe.

2. The combination with two brackets, a frame pivoted in said brackets, a case pivoted in the frame, a rod extending through the case, means to support one side of the rod, means to frictionally engage the other side of the rod, and a bar forming with the last-named means a toggle-joint to grip the rod when it is moved in one direction and to release the same when it is moved in the other direction.

3. The combination with a case, of a rod to slide through the case, means to support one side of the rod, means to frictionally engage the other side of the rod, a bar pivotally connected with said last-named means to form a toggle-joint therewith, and a spring to hold the joint in operative position to cause friction upon the rod when the same is moved in one direction.

4. The combination with a case, of a rod to slide through the case, means to support one side of the rod, means to frictionally engage the other side of the rod, a bar pivotally connected with said last-named means to form a toggle-joint therewith, a spring to hold the joint in operative position to cause friction upon the rod when the same is moved in one direction, a block to support the end of the swinging bar, and means to adjust the block.

5. The combination with the case, of a slip-rod, a shoe and a swinging bar arranged to form a toggle-joint to frictionally resist the movement of the rod, a block to support the end of the swinging bar, and means to adjust the block.

In testimony whereof, I have hereunto set my hand at Los Angeles, California, this 3d day of April, 1909.

GEO. CUSHING MARTIN.

In presence of—
 JAMES R. TOWNSEND,
 M. BEULAH TOWNSEND.